Feb. 23, 1960 A. C. SCHNEIDER 2,925,869
DRIVEN STONE GATHERER
Filed March 13, 1957 2 Sheets-Sheet 1

A. C. Schneider INVENTOR.

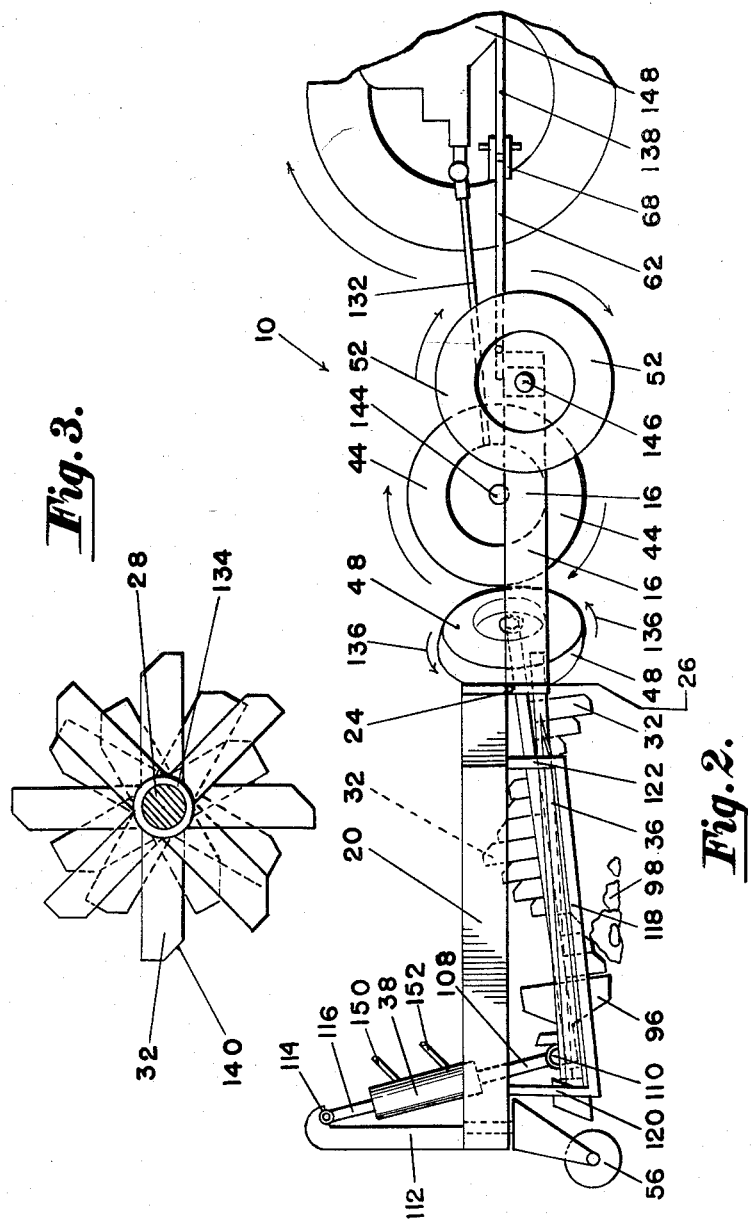

United States Patent Office 2,925,869
Patented Feb. 23, 1960

2,925,869

DRIVEN STONE GATHERER

Arthur C. Schneider, Hinckley, Minn.

Application March 13, 1957, Serial No. 645,748

3 Claims. (Cl. 171—63)

This invention relates to rock and stone gathering and raking machines for removing rocks and the like from farm lands, and in particular a pair of raking elements positioned in a V in a horizontally disposed frame designed to be drawn by a tractor in which the raking elements include spirally disposed blades of different lengths carried by shafts rotated by a towing tractor, and wherein the blades flip or kick the rocks, stones, or the like into rock receiving pans, with rocks not thrown into the pans by the rakes removed from the soil by scoop elements positioned in the vertex of the V.

The purpose of this invention is to provide a rock raking and removing machine in which the rock engaging elements are of such construction and are so mounted that a yielding action is provided whereby the parts are not damaged or broken by the extreme abuse to which such rock raking and removing devices are subjected.

In some farming areas where uncultivated farm lands are being worked, and also in some cultivated farm lands, particularly where soil conditions are hazardous to farm machinery regular routine removal of rocks and debris is continued, and is required before such operations as plowing, discing, harrowing, and the like may be adequately accomplished. Conventional machines for gathering and removing stones, rocks, and the like, particularly where tines or forks are used are continually breaking due to the extreme abuse to which such parts are subjected.

With this thought in mind this invention contemplates a triangular or V-shaped frame designed to be mounted on a tractor with relatively heavy blades of varying lengths positioned in spirals on shafts rotated by the power take-off of the tractor wherein with the blades passing through soil rocks are removed and deposited upon trays from which the rocks are dumped by hydraulic means in piles upon the soil.

The object of this invention is, therefore, to provide a rock and stone gathering and collecting machine that works rocks and the like out of the soil as the machine is drawn over a field and deposits the rocks and the like in piles so that they may readily be picked up and hauled from the field.

Another object of the invention is to provide a rock gathering and removing machine that is provided with cushioning means to prevent damage to parts thereof as the parts engage heavy rocks or fixed obstructions in the field.

Another important object of the invention is to provide a rock and stone gathering and removing machine that is driven by the power take-off of a tractor upon which the machine is mounted.

It is yet another object of the invention to provide a machine for gathering rocks and the like in which rock engaging elements of the machine are frictionally driven so that the parts are free to slip upon engagement thereof which fixed obstructions.

A further object of the invention is to provide a machine for raking and removing rocks, debris, and the like from farm lands in which the raking elements are positioned in the form of a V so that the rocks and the like are drawn together at the vertex of the V to facilitate removal of the rocks from the soil.

A still further object is to provide a rock gathering machine in which the rocks are deposited upon trays and in which the trays are actuated by hydraulic means for dumping the rocks in piles upon the ground.

And a still further object is to provide a machine for gathering rocks and the like which is of a simple and economical construction.

With these and other objects and advantages in view the invention embodies a horizontally positioned frame formed to be connected to a tractor with relatively heavy rock engaging blades positioned in spirals on shafts positioned to form a V in which the shafts are rotated through friction driving elements from power means of a towing tractor, and in which the rocks or the like are deposited upon trays that are actuated by hydraulic means for depositing the rocks upon the ground.

Other features and advantages of the invention will appear from the following description taken in connection with the drawings, wherein:

Figure 2 is a side elevational view of the machine showing a rear portion of a tractor to which the forward end of the machine is connected.

Figure 3 is a cross section through one of the raking elements taken on line 3—3 of Figure 1, with the parts shown on an enlarged scale and with parts omitted, illustrating the spiral arrangement of the rock raking blades.

Figure 1:
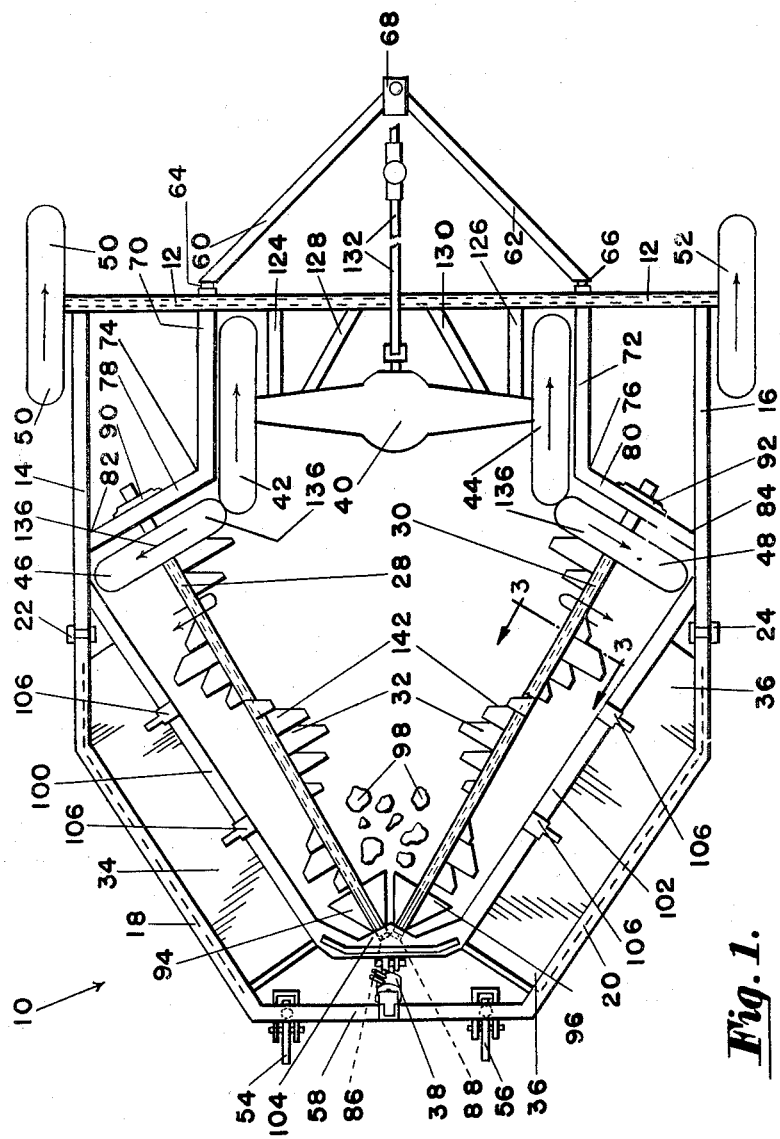
Figure 1 is a plan view of the improved rock and stone collecting and removing machine showing a tongue at the forward end for connecting the device to a tractor.

While one embodiment of the invention is illustrated in the above-referred-to drawings, it is to be understood that they are merely for the purpose of illustration and that various changes in construction may be resorted to in the course of manufacture in order that the invention may be utilized to the best advantage according to circumstances which may arise, without in any manner departing from the spirit and intention of the device, which is to be limited only in accordance with the appended claims. And while there is stated the primary field of utility of the invention, it remains obvious that it may be employed in any other capacity wherein it may be found applicable.

In the accompanying drawings, and in the following specification the same reference characters are used to designate the same parts and elements throughout, wherein the numeral 10 refers to the invention in its entirety, numeral 12 indicating a transversely disposed forward beam, numerals 14 and 16 parallel side bars extended rearwardly from the beam, numerals 18 and 20 diagonally positioned bars pivotally connected to extended ends of the side bars with pins 22 and 24 at the upper ends of vertical struts 26, numerals 28 and 30 shafts positioned in a V and having digging blades 32 spirally positioned thereon, numerals 34 and 36 trays for receiving rocks and the like from the rakes formed with the blades 32, numeral 38 a hydraulic cylinder for elevating and lowering the trays for depositing the rocks upon the ground, numeral 40 a differential having wheels 42 and 44 on the ends, and numerals 46 and 48 wheels mounted on the shafts 28 and 30 and positioned to frictionally engage the wheels 42 and 44 for frictionally driving the shafts with the blades thereon.

The frame of the attachment or machine, which is formed with a square leading end is mounted on wheels with wheels 50 and 52 rotatably mounted at the ends of the beam 12 and casters 54 and 56 mounted on a bar 58 connecting the rear ends of the diagonally disposed or converging bars 18 and 20. The forward end of the frame is provided with a V-shaped tongue having arms 60 and 62 connected to the beam 12 with hinges 64 and 66, and the extended ends of the arms are provided with a clevis 68 by which the device is attached to a tractor.

Spaced inwardly from the side bars 14 and 16 are inner parallel bars 70 and 72, which, at the points 74 and 76 extend diagonally outwardly to the side bars 14 and 16. The sections 78 and 80 of the bars are connected to the side bars at the points 82 and 84, and these sections are provided with bearings in which the leading ends of the shafts 28 and 30 are rotatably mounted. The trailing ends of the shafts are rotatably mounted in a block forming bearings 86 and 88, and the bearings 86 and 88 are aligned with bearings 90 and 92 on the sections 78 and 80 and in which the leading ends of the shafts are mounted.

The trailing ends of the shafts 28 and 30 are provided with triangular-shaped baffles or plates which are positioned at 90° points on the shafts, and the baffles, which are indicated by the numerals 94 and 96 are positioned to receive rocks, stones, and the like, as indicated by the numeral 98, and, rotating with the shafts coact with the blades to carry the rocks and the like upwardly, depositing the rocks or the like upon the trays. Therefore, the blades, being spirally positioned and of varying lengths ferret the rocks from the soil with a screw-like action with the rocks moving rearwardly whereby the blades coact with the baffles 94 and 96 working the rocks upwardly with the slow moving action of a worm, and dropping the rocks over the center and upon the trays.

The frame also includes an inner substantially V-shaped frame having convergent side rails 100 and 102, the rear ends of which are connected by a web 104 and the forward ends of which are connected to the side bars 14 and 16, and the rock receiving trays 34 and 36, which are fixedly connected to the bars 18 and 20, are hinged to the rails 100 and 102 by hinges 106. The web 104 upon which the bearings 86 and 88 are mounted is connected to a piston rod 108 by a pin 110, and the piston rod extends from the hydraulic cylinder 38, the upper end of which is connected to an upright 112 by a pin 114 at the end of a support 116. The upright 112 is mounted on the cross bar 58 which connects the trailing ends of the bars 18 and 20.

By this means the inner frame including the rails 100 and 102 is elevated by the hydraulic cylinder when it is desired to dump rocks and the like from the trays.

The rear portion of the frame also includes oppositely disposed bars 118, the ends of which are connected to the upper frame members or side bars 14 and 16 by vertically disposed braces 120 and 122, and the lower edges of the rock receiving trays are supported by the lower parts of the bars 118.

The differential housing is supported from the beam 12 by struts 124 and 126 and diagonally positioned braces 128 and 130. A drive shaft 132, which extends forwardly from the differential is operatively connected to the power take-off of the tractor to which the device is attached.

As illustrated in Figure 3, the digging blades 32, which are of different lengths, are positioned in spirals and the blades are mounted on sleeves 134 on the shafts 28 and 30, and upon rotation of the shafts, in the direction of the arrows 136, rocks, stones, and the like are worked out of the soil with a screw-like action and deposited upon the trays 34 and 36 from which they are deposited upon the ground by elevating inner edges of the trays with the hydraulic cylinder 38.

The rock engaging blades 32 are relatively thick and the outer ends are provided with beveled corners 140 on the trailing surfaces, and also beveled surfaces 142 on the forward sides.

In the design shown the wheels 42 and 44 are mounted on shafts 144, and the wheels 50 and 52 on shafts 146, and a tractor to which the attachment is connected is indicated by the numeral 148.

*Operation*

With the parts assembled as illustrated and described the clevis 68 is attached to the draw-bar 138 of a tractor and the drive shaft connected to a power take-off of the tractor, and as the machine or attachment is drawn forwardly the blades 32 work stones, rocks, and the like from the soil, depositing the stones and the like upon the trays 34 and 36. Rocks that are not deposited upon the trays accumulate in the vertex of the V, as shown in Figure 1, and these rocks are elevated by the baffles 94 and 96 and also deposited upon the trays.

When sufficient quantities of rocks and the like are positioned on the trays the cylinder is actuated by supplying fluid under pressure through the connections 150 and 152 whereby the inner edges of the trays are elevated and the rocks and the like deposited upon the ground.

With the blades driven by the pneumatic tires on the wheels the blades on either shaft may stop when a blade engages a heavy rock or a fixed obstruction, so that damage to the parts is substantially eliminated.

The parts are designed to be actuated by an operator on the seat of a towing tractor so that the machine may be driven back and forth over a field or fields continuously until the rocks are removed.

From the foregoing specification it is thought to be obvious that the invention disclosed will adequately accomplish the functions for which it has been designed and in an economical manner, and that its simplicity, accuracy, and ease of operation are such as to provide a relatively inexpensive device, considering what it will accomplish, and that it will find an important place in the art to which it apertains when once placed on the market.

It is thought that persons skilled in the art to which the invention relates will be able to obtain a clear understanding of the invention after considering the description in connection with the drawings. Therefore, a more lengthy description is regarded as unnecessary.

Changes in shape, size, and rearrangement of details and parts such as come within the purview of the invention claimed may be resorted to in actual practice, if desired.

Having now described the invention that which is claimed to be new and desired to be procured by Letters Patent, is:

1. In a stone gatherer, the combination which comprises a horizontally disposed frame with a square leading end and with side bars having converging rear portions extending from ends of said leading end, means for attaching the frame to a tractor with the leading end of the frame positioned forwardly of the rear wheels of the tractor, ground engaging wheels on the leading end of the frame, casters on the trailing end of the frame, horizontally disposed shafts rotatably mounted on the frame and positioned in a V in plan, wheels mounted on the leading ends of the shafts, the shafts being positioned whereby the wheels on the leading ends thereof frictionally contact surfaces of the wheels of a tractor on which the frame is positioned whereby the shafts are rotated by movements of the tractor, digging blades mounted on the shafts, the digging blades being positioned in a spiral and mounted to extend into soil upon which the gatherer is positioned whereby upon forward movement of the gatherer stones, rocks, and the like are ferreted from the soil, and a hydraulic cylinder operatively connected to the trailing ends of the shafts for raising and lowering the digging blades.

2. A stone gatherer as described in claim 1, in which radially disposed triangular-shaped blades are provided on trailing ends of the shafts whereby stones worked into the center of the frame by the digging blades are elevated from the soil.

3. A stone gatherer as described in claim 1, in which radially disposed triangular-shaped blades are provided on trailing ends of the shafts whereby stones worked into the center of the frame by the digging blades are elevated from the soil, and wherein trays pivotally mounted on the frame and positioned to receive stones from the digging blades are actuated by said hydraulic cylinder to dump stones accumulated thereon upon the ground.

References Cited in the file of this patent
UNITED STATES PATENTS

| | | |
|---|---|---|
| 296,168 | Higley | Apr. 1, 1884 |
| 1,189,016 | Thompson | June 27, 1916 |
| 1,380,936 | Steffan | June 7, 1921 |
| 1,406,063 | Nagy | Feb. 7, 1922 |
| 1,666,836 | Santee | Apr. 17, 1928 |
| 2,557,475 | Schieman | June 19, 1951 |
| 2,618,111 | Egstad | Nov. 18, 1952 |